United States Patent
Wang (10) Patent No.: US 11,137,865 B2
(45) Date of Patent: Oct. 5, 2021

(54) TOUCH SCREEN, METHOD FOR MANUFACTURING THE SAME AND TOUCH DISPLAY DEVICE

(71) Applicants: MIANYANG BOE OPTOELECTRONICS TECHNOLOGY CO., LTD., Mianyang (CN); BOE TECHNOLOGY GROUP CO., LTD., Beijing (CN)

(72) Inventor: Xuan Wang, Beijing (CN)

(73) Assignees: MIANYANG BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/652,033

(22) PCT Filed: Sep. 18, 2019

(86) PCT No.: PCT/CN2019/106347
§ 371 (c)(1),
(2) Date: Mar. 28, 2020

(87) PCT Pub. No.: WO2020/063411
PCT Pub. Date: Apr. 2, 2020

(65) Prior Publication Data
US 2020/0249795 A1 Aug. 6, 2020

(30) Foreign Application Priority Data
Sep. 25, 2018 (CN) .......................... 201811119728.0

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0448* (2019.05);
(Continued)

(58) Field of Classification Search
CPC ..... G06F 3/0412; G06F 3/0446; G06F 3/0448
(Continued)

(56) References Cited

U.S. PATENT DOCUMENTS 7,263,835 B2  9/2007 Lin
8,816,967 B2  8/2014 Lyon et al.
(Continued)

FOREIGN PATENT DOCUMENTS

CN  1621769 A  6/2005
CN  101685118 A  3/2010
(Continued)

OTHER PUBLICATIONS

International Search Report and Written Opinion dated Nov. 13, 2019, for corresponding PCT Application No. PCT/CN2019/106437.
(Continued)

*Primary Examiner* — Prabodh M Dharia
(74) *Attorney, Agent, or Firm* — Kinney & Lange, P.A.

(57) ABSTRACT

A touch screen, a method for manufacturing the same and a touch display device are provided. The touch screen includes, a substrate; an electrode connecting layer on the substrate; a first insulating layer covering the electrode connecting layer; an electrode layer on the first insulating layer; the electrode layer comprises a plurality of first electrodes arranged in an array and a plurality of second electrodes arranged in an array; each first electrode and each second electrode are in a closed loop structure, and each second electrode surrounds a first electrode, wherein two adjacent second electrodes in each row of the second elec-
(Continued)

trodes are electrically connected to each other, the first insulating layer comprises a plurality of through holes to expose a part of the electrode connecting layer, and two adjacent first electrodes in each column of the first electrodes are respectively electrically connected to the electrode connecting layer through the through holes to electrically connect the two adjacent first electrodes.

18 Claims, 5 Drawing Sheets

(52) U.S. Cl.
CPC .............. *G06F 2203/04103* (2013.01); *G06F 2203/04111* (2013.01)

(58) Field of Classification Search
USPC .................................. 345/173, 174; 349/12
See application file for complete search history.

(56) References Cited

U.S. PATENT DOCUMENTS

| | | |
|---|---|---|
| 2010/0073319 A1 | 3/2010 | Lyon et al. |
| 2012/0062248 A1 | 3/2012 | Lee et al. |
| 2015/0015803 A1* | 1/2015 | Wang .................... G06F 3/0445 349/12 |
| 2015/0185936 A1* | 7/2015 | Kim .................... G06F 3/04166 345/174 |
| 2015/0345850 A1 | 12/2015 | Bolukbasi et al. |
| 2016/0378233 A1* | 12/2016 | Huo ....................... G06F 3/0412 345/174 |
| 2017/0010734 A1* | 1/2017 | Liu .......................... H01L 51/56 |
| 2017/0365653 A1* | 12/2017 | Kim ..................... G02F 1/13458 |
| 2019/0102012 A1* | 4/2019 | Shi .................... G02F 1/133512 |
| 2020/0249795 A1 | 8/2020 | Wang |

FOREIGN PATENT DOCUMENTS

| | | |
|---|---|---|
| CN | 201725318 U | 1/2011 |
| CN | 102378886 A | 3/2012 |
| CN | 102803873 A | 11/2012 |
| CN | 105867712 A | 8/2016 |
| CN | 106959790 A | 7/2017 |
| CN | 107704124 A | 2/2018 |
| CN | 207247660 U | 4/2018 |
| CN | 108509093 A | 9/2018 |
| CN | 109213391 A | 1/2019 |
| GB | 1490117 | 10/1977 |
| JP | 5780455 B2 | 9/2015 |

OTHER PUBLICATIONS

First Chinese Office Action dated Jan. 14, 2020, for corresponding Chinese Application No. 201811119728.0.

International Search Report and Written Opinion dated Nov. 13, 2019, for corresponding PCT Application No. PCT/CN2019/106347.

* cited by examiner

TOUCH SCREEN, METHOD FOR MANUFACTURING THE SAME AND TOUCH DISPLAY DEVICE

CROSS-REFERENCE TO RELATED APPLICATION(S)

The present application is a Section 371 National Stage Application of International Application No. PCT/CN2019/106347, filed on Aug. 22, 2019, which in turn claims the benefit of Chinese Patent Application No. 201811119728.0 filed on Sep. 25, 2018 in the National Intellectual Property Administration of China, the whole disclosure of which is incorporated herein by reference.

TECHNICAL FIELD

The present disclosure relates to the field of display technology, and in particular, to a touch screen, a manufacturing method thereof, and a touch display device.

BACKGROUND

With the continuous development of display technology, touch display technology has also received widespread attention. In the related art, driving electrodes and sensing electrodes are generally made on encapsulated light-emitting devices, and detection signals are input to the driving electrodes. When a user touches the touch screen, the signal on the sensing electrode at the touch position will change, and the user's touch position is determined according to the position where the signal changes. In the touch screens of the related art, the driving electrodes Tx and the sensing electrodes Rx are separately provided. Therefore, the number of the driving electrodes Tx and the sensing electrodes Rx provided in a unit area is relatively small, resulting in a low utilization rate of the touch screen, and resulting in a reduced touch resolution.

SUMMARY

According to an aspect of the present disclosure, there is provided a touch screen comprising: a substrate; an electrode connecting layer on the substrate; a first insulating layer covering the electrode connecting layer; an electrode layer on the first insulating layer; the electrode layer comprises a plurality of first electrodes arranged in an array and a plurality of second electrodes arranged in an array; each first electrode and each second electrode are in a closed loop structure, and each second electrode surrounds a first electrode, wherein two adjacent second electrodes in each row of the second electrodes are electrically connected to each other, the first insulating layer comprises a plurality of through holes to expose a part of the electrode connecting layer, and two adjacent first electrodes in each column of the first electrodes are respectively electrically connected to the electrode connecting layer through the through holes to electrically connect the two adjacent first electrodes.

In some embodiments, one of the first electrode and the second electrode is an sensing electrode, and the other is a driving electrode.

In some embodiments, the two adjacent second electrodes in each row of the second electrodes are in contact with each other.

In some embodiments, an area of each first electrode is equal to an area of each second electrode.

In some embodiments, the closed loop structure is any one of a diamond shape, a rectangular shape, a trapezoidal shape, a hexagonal shape, and a circular shape.

In some embodiments, each first electrode and each second electrode are both in a Ti/Al/Ti laminated structure.

In some embodiments, a material of the electrode connecting layer is the same as that of the electrode layer.

In some embodiments, the touch screen further comprises a planarization layer covering the electrode layer.

According to another aspect of the present disclosure, there is provided a method for manufacturing a touch screen, comprising: providing a substrate; forming an electrode connecting layer on the substrate through a patterning process; forming a first insulating layer, and covering the electrode connecting layer with the first insulating layer; forming a plurality of through holes passing through the first insulating layer to expose a part of the electrode connecting layer; forming an electrode layer on the first insulating layer through a patterning process, wherein the electrode layer comprises a plurality of first electrodes arranged in an array and a plurality of second electrodes arranged in an array, each first electrode and each second electrode are in a closed loop structure, and each second electrode surrounds a first electrode, wherein two adjacent second electrodes in each row of the second electrodes are electrically connected to each other, and two adjacent first electrodes in each column of the first electrodes are respectively electrically connected to the electrode connecting layer through the through holes to electrically connect the two adjacent first electrodes.

In some embodiments, one of the first electrode and the second electrode is an sensing electrode, and the other is a driving electrode.

In some embodiments, the method further comprises: forming a planarization layer covering the electrode layer.

According to yet another aspect of the present disclosure, there is provided a touch display device comprising the touch screen mentioned above.

In some embodiments, the touch display device further comprises a light-emitting device, a encapsulation layer and a second insulating layer, the light-emitting device, the encapsulation layer and the second insulating layer are sequentially disposed on the substrate in a direction away from the substrate, the encapsulation layer covers the light-emitting device, and the electrical connecting layer is located on a side of the second insulating layer away from the substrate.

According to yet another aspect of the present disclosure, there is provided a method for manufacturing a touch display device, comprising the method for manufacturing the touch screen mentioned above.

In some embodiments, before the step of forming an electrode connecting layer on the substrate through a patterning process, the method further comprises: forming a light-emitting device on the substrate; forming an encapsulation layer covering the light-emitting device; forming a second insulating layer on the encapsulation layer.

According to yet another aspect of the present disclosure, there is provided a touch display device comprising the touch screen mentioned above.

DETAILED DESCRIPTION OF EMBODIMENTS

In order to make the objectives, features, and advantages of the present disclosure more comprehensible, the present disclosure will be further described in detail below with reference to the accompanying drawings and specific embodiments.

Figure 1:
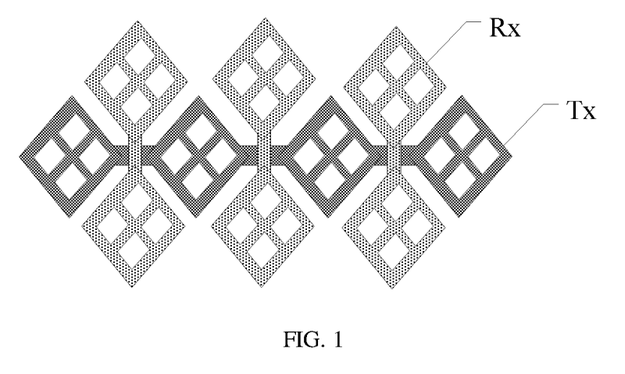
FIG. 1 shows a schematic structural diagram of a driving electrode and an sensing electrode of the related art.

As shown in FIG. 1, in a touch screen of the related art, the driving electrodes Tx and the sensing electrodes Rx are discretely arranged. In a unit area, the number of the driving electrodes Tx and the sensing electrodes Rx provided in the touch screen is relatively small, which makes the utilization of the touch screen is poor, resulting in a reduction in touch resolution.

According to the general inventive concept of the present disclosure, a touch screen is provided, which comprises a substrate; an electrode connecting layer on the substrate; a first insulating layer covering the electrode connecting layer; an electrode layer on the first insulating layer; the electrode layer comprises a plurality of first electrodes arranged in an array and a plurality of second electrodes arranged in an array; each first electrode and each second electrode are in a closed loop structure, and each second electrode surrounds a first electrode, wherein two adjacent second electrodes in each row of the second electrodes are electrically connected to each other, the first insulating layer comprises a plurality of through holes to expose a part of the electrode connecting layer, and two adjacent first electrodes in each column of the first electrodes are respectively electrically connected to the electrode connecting layer through the through holes to electrically connect the two adjacent first electrodes.

Figure 2:
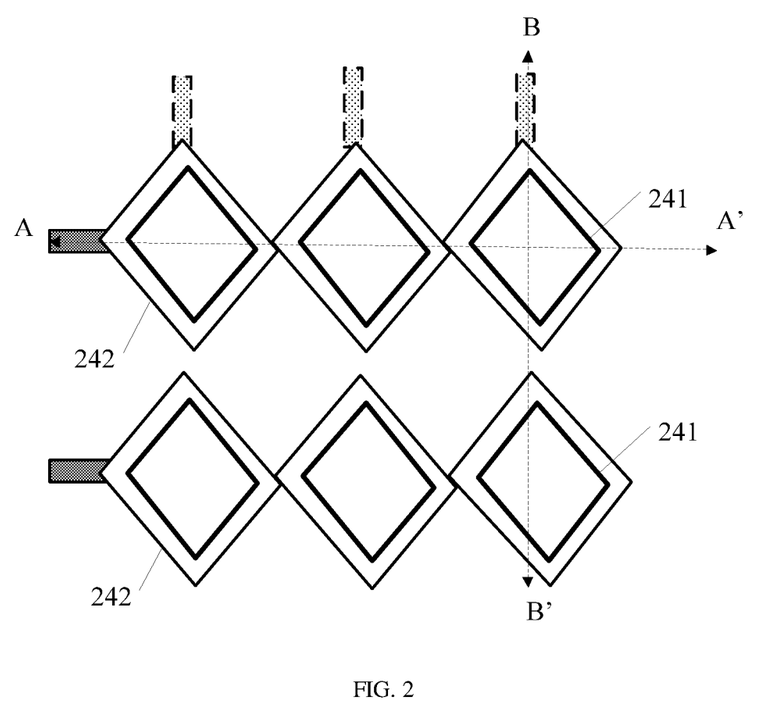
FIG. 2 shows a schematic structural diagram of a touch screen according to an embodiment of the present disclosure.
Figure 3:
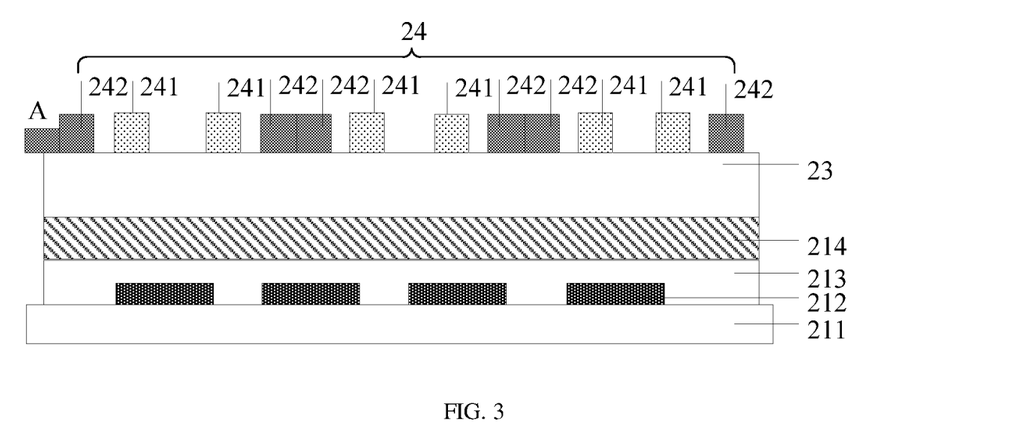
FIG. 3 shows a cross-sectional view of the touch screen shown in FIG. 2 taken along a section A-A'.
Figure 4:
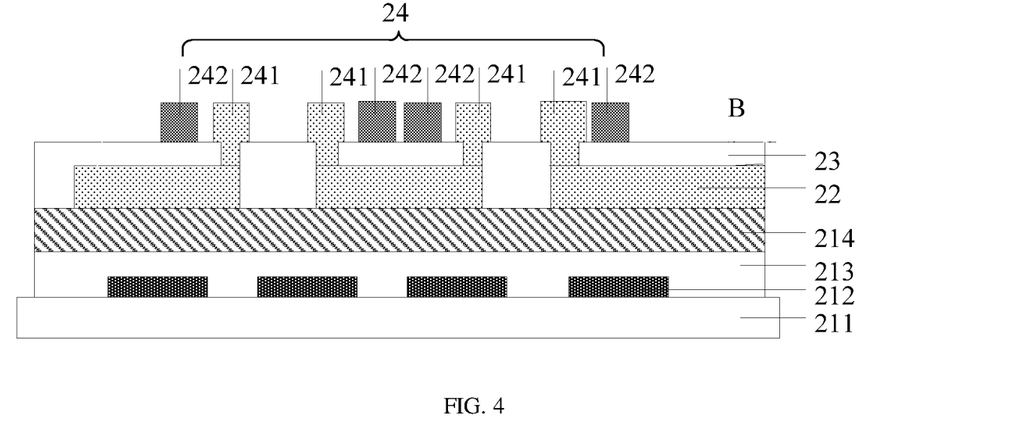
FIG. 4 shows a cross-sectional view of the touch screen shown in FIG. 2 taken along a section B-B'.

Referring to FIG. 2, a schematic structural diagram of a touch screen according to an embodiment of the present disclosure is shown. FIG. 3 shows a cross-sectional view of the touch screen shown in FIG. 2 taken along a section AA'. FIG. 3 shows a cross-sectional view of the touch screen shown in FIG. 2 taken along a section BB'.

An embodiment of the present disclosure provides a touch screen including: a substrate 211, an electrode connecting layer 22 formed on the substrate 211; a first insulating layer 23 covering the electrode connecting layer 22; and an electrode layer 24 on the first insulating layer 23.

The electrode layer 24 includes a plurality of first electrodes 241 arranged in an array and a plurality of second electrodes 242 arranged in an array. As shown in FIG. 2, the direction along the section line AA' is a row direction of the array, and the direction along the section line BB' is a column direction of the array, and the row direction and the column direction are arranged to be perpendicular to each other. All the first electrodes 241 and the second electrodes 242 have a closed loop structure, and each second electrode 242 surrounds a first electrode 241. Two adjacent first electrodes 241 in each column are connected to the electrode connecting layer 22 through the through-holes M passing through the first insulating layer 23, and two adjacent second electrodes 242 in each row are connected; one of the first electrode 241 and the second electrode 242 is an sensing electrode Rx, and the other is a driving electrode Tx.

Specifically, the first electrode 241 is an sensing electrode Rx, and the second electrode 242 is a driving electrode Tx; or, the first electrode 241 is a driving electrode Tx, and the second electrode 242 is an sensing electrode Rx.

The second electrodes 242 of any two adjacent rows are not connected, and two adjacent second electrodes 242 of each row are connected; the first electrodes 241 of any two adjacent rows are not connected, and the two adjacent first electrodes 241 of each column are connected to the electrode connecting layer 22 through the through holes passing through the first insulating layer 23, so a coupling capacitance is formed between the second electrode 242 and the electrode connecting layer 22 at a corresponding position. When the first electrode 241 is the sensing electrode Rx and the second electrode 242 is the driving electrode Tx, a detection signal is provided to the second electrode 242 in the electrode layer 24. When the user touches the touch screen, the capacitance value of the coupling capacitor between the second electrode 242 and the electrode connecting layer 22 at the corresponding position will change. By receiving a signal from the first electrode 241 in the electrode layer 24 to calculate the user's touch position, or when the first electrode 241 is the driving electrode Tx and the second electrode 242 is the sensing electrode Rx, a detection signal is provided to the first electrode 241 in the electrode layer 24. When the user touches the touch screen, the capacitance value of the coupling capacitor between the second electrode 242 and the electrode connecting layer 22 at the corresponding position is changed, and the signal from the second electrode 242 in the electrode layer 24 is received to calculate the touch position of the user.

By changing the distribution of the first electrode 241 and the second electrode 242 in the electrode layer 24 so that the second electrode 242 surrounds the first electrode 241, the first electrode 241 inside the second electrode 242 does not occupy additional area, thereby reducing the area occupied by the first electrode 241. When the first electrode 241 is the sensing electrode Rx and the second electrode 242 is the driving electrode Tx, the occupied area of the sensing electrode Rx is reduced; or when the first electrode 241 is the driving electrode Tx and the second electrode 242 is the sensing electrode Rx, the occupied area of the driving electrode Tx is reduced. In this way, the number of driving electrodes Tx and sensing electrodes Rx provided in the touch screen can be greatly increased in a unit area, thereby improving the utilization rate of the touch screen, and improving the touch resolution, and improving the touch accuracy.

It should be noted that, since the first electrodes 241 in any two adjacent columns are not connected, a cross-sectional view taken along a cross section A-A', that is, in FIG. 3, the electrode connecting layer 22 is not visible.

In the embodiment of the present disclosure, the first electrode 241 and the second electrode 242 both adopt a laminated structure of Ti/Al/Ti. Of course, other metals or metal oxide materials such as ITO (Indium Tin Oxide) or IZO (Indium Zinc Oxide) can also be used; the material of the electrode connecting layer 22 may be the same as that of the second electrode 242 and the first electrode 241; the material of the first insulating layer 23 is silicon nitride or silicon oxide, etc.

In an optional embodiment of the present disclosure, the areas of the first electrode 241 and the second electrode 242 are equal.

By setting the areas of the second electrode 242 and the first electrode 241 to be equal during the manufacturing process, the area of the capacitor composed of the second electrode 242 and the first electrode 241 is the largest, and the sensitivity of touch can be improved.

Since the second electrode 242 surrounds the first electrode 241 externally, during the actual manufacturing process, the width of the first electrode 241 is larger than the width of the second electrode 242 to ensure that the areas of the second electrode 242 and the first electrode 241 are equal.

In the embodiment of the present disclosure, the closed loop structure is any one of a diamond shape, a rectangular shape, a trapezoidal shape, a hexagonal shape, and a circular shape, that is, the shapes of the first electrode 241 and the second electrode 242 are any one of a diamond shape, a rectangular shape, a trapezoidal shape, a hexagonal shape, and a circular shape.

Of course, the shape of the first electrode 241 and the second electrode 242 may also be a polygon such as a triangle or a pentagon, or a closed curve such as an ellipse, or a closed shape formed by a curve, such as an arc, and a straight line. All shapes that confirms to closed loop can be applicable to the technical solutions of the present disclosure.

As shown in FIG. 3, a light-emitting device 212 is formed on the substrate 211; an encapsulation layer 213 is formed on the light-emitting device 212 to cover the light-emitting device 212, and a second insulating layer 214 is formed on the encapsulation layer 213.

The substrate 211 is a glass substrate. A light-emitting device 212 is formed on the substrate 211. The light-emitting device 212 includes an anode, a light-emitting layer, and a cathode. Specifically, an anode is firstly formed on the substrate 211, and then the light-emitting layer is formed on the anode by evaporation or printing. Finally a cathode is formed. After the light-emitting device 212 is completed, an encapsulation layer 213 covering the light-emitting device 212 is formed to isolate water and oxygen and to protect the light-emitting device 212. A second insulating layer 214 is formed on the encapsulation layer 213. The material of the second insulating layer 214 is silicon nitride or silicon oxide.

Specifically, the electrode connecting layer 22 is formed on the second insulating layer 214.

Figure 5:
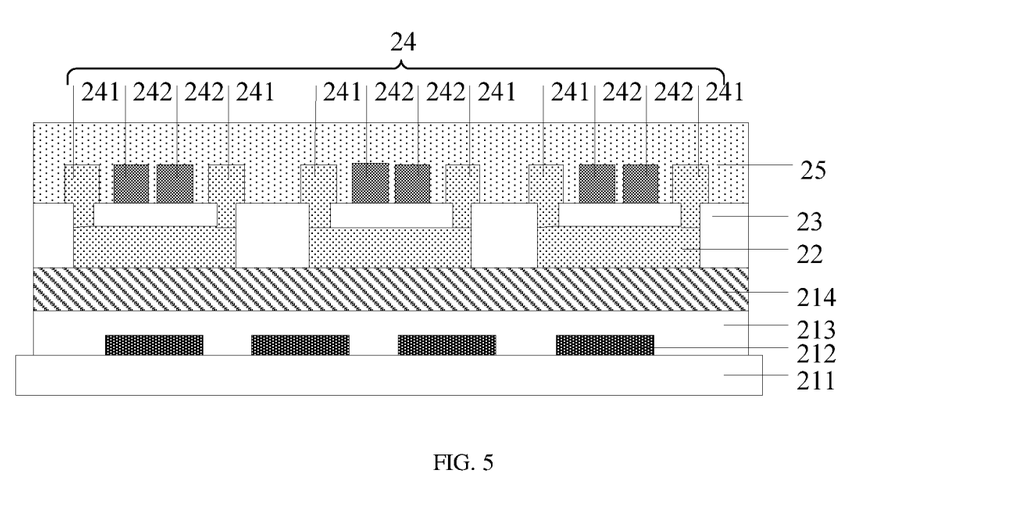
FIG. 5 shows a schematic structural diagram of another touch screen according to an embodiment of the present disclosure.

Referring to FIG. 5, a schematic structural diagram of another touch screen according to an embodiment of the present disclosure is shown.

The touch screen according to the embodiment of the present disclosure further includes a planarization layer 25, and the planarization layer 25 covers the electrode layer 24.

A planarization layer 25 covering the electrode layer 24 is formed to implement a flattening process on the touch screen. The material of the planarization layer 25 is an organic material.

It should be noted that the planarization layer shown in FIG. 5 is formed on the structure shown in FIG. 4. Of course, the planarization layer 25 may be formed in the structure diagram shown in FIG. 3.

In the embodiment of the present disclosure, by forming an electrode connecting layer on a substrate, a first insulating layer covering the electrode connecting layer is formed, and an electrode layer is formed on the first insulating layer. The electrode layer includes a plurality of first electrodes and a plurality of second electrodes. The first electrodes and the second electrodes all have a closed loop structure, and each second electrode surrounds a first electrode, and two adjacent first electrodes in each column are respectively connected to the electrode connecting layer via through holes passing through the first insulating layer. Two adjacent second electrodes of each row are connected. A plurality of first electrodes and a plurality of second electrodes are provided in the electrode layer, and each second electrode surrounds a first electrode, thereby reducing the area occupied by the first electrode. The first electrode is an sensing electrode and the second electrode is a driving electrode; or, the first electrode is a driving electrode and the second electrode is an sensing electrode, which can greatly increase the number of driving electrodes and sensing electrodes provided in the touch screen in a unit area, and improve the utilization rate of the touch screen. Furthermore, the touch resolution is improved, so that the touch accuracy is improved.

Figure 6:
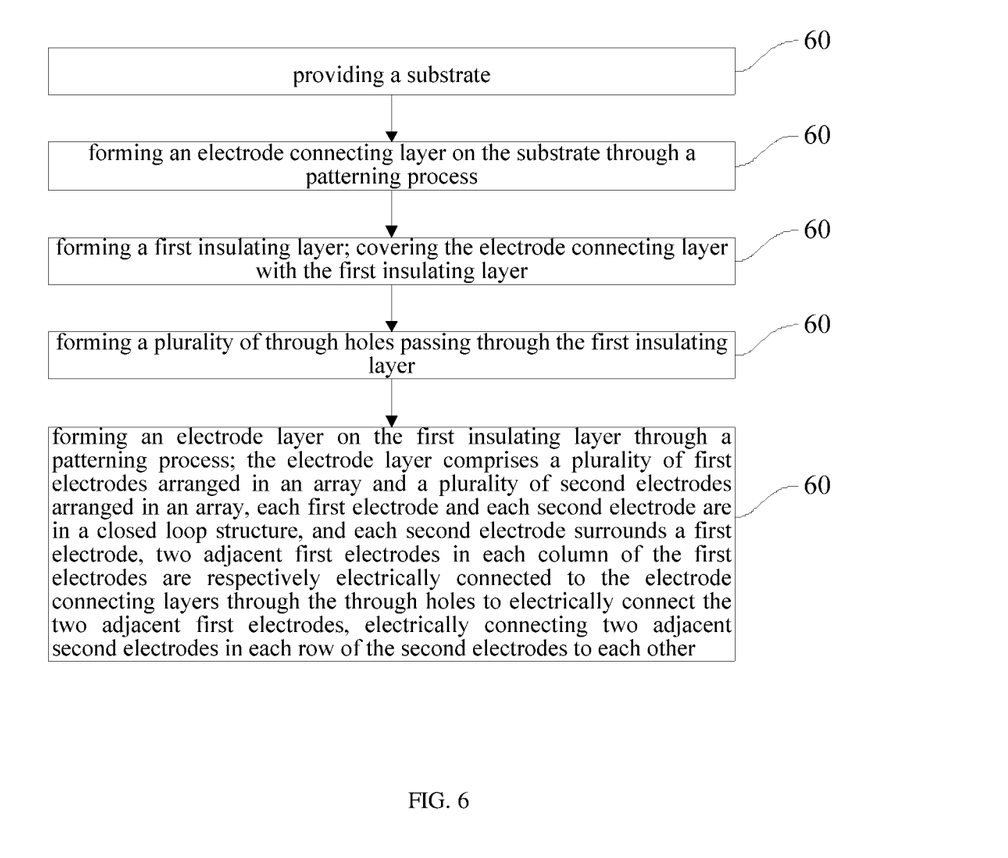
FIG. 6 shows a flowchart of a method for manufacturing a touch screen according to an embodiment of the present disclosure.

Referring to FIG. 6, a flowchart of a method for manufacturing a touch screen according to an embodiment of the present disclosure is shown, which may specifically include the following steps:

Step 601: providing a substrate.

In the embodiment of the present disclosure, when manufacturing a touch screen, a substrate 211 is needed to be provided at first.

Specifically, a light-emitting device is formed on a substrate; an encapsulation layer is formed, and the encapsulation layer covers the light-emitting device; and a second insulating layer is formed on the encapsulation layer.

Figure 7:
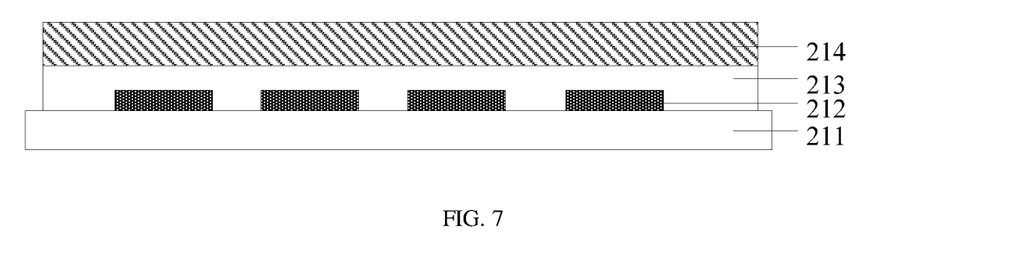
FIG. 7 shows a schematic diagram showing an integral structure including a light-emitting device, a encapsulation layer and a second insulating layer 214 in an embodiment of the present disclosure.

Referring to FIG. 7, a schematic structural diagram of each component on a substrate in the embodiment of the present disclosure is shown.

Firstly, an anode is formed on the substrate 211, then a light-emitting layer is formed on the anode by evaporation or printing, and finally a cathode is formed to realize the formation of a light-emitting device 212 on the substrate 211. After the light-emitting device 212 is finished, the encapsulation layer 213 covering the light-emitting device 212 may be formed which may use TFE (Thin Film Encapsulation) to encapsulate the light-emitting device 212. After encapsulating the light-emitting device 212, a CVD (Chemical Vapor Deposition) process or other deposition process is used to deposit the second insulating layer 214 on the encapsulation layer 213. The material of the second insulating layer 214 is silicon nitride or silicon oxide.

step 602, forming an electrode connecting layer on the substrate through a patterning process.

Figure 8:
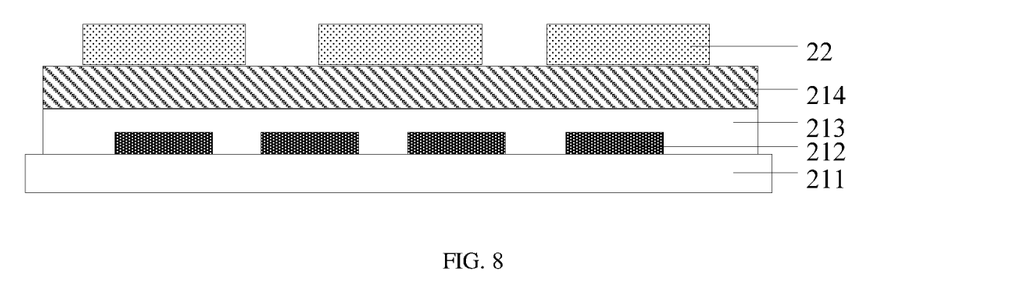
FIG. 8 shows a schematic diagram of a structure after an electrode connecting layer is formed in an embodiment of the present disclosure.

After the structure shown in FIG. 7 is obtained, an electrode connecting layer film is formed on it with a sputtering process, a photoresist is applied on the electrode connecting layer film, and a mask corresponding to the electrode connecting layer film is used to expose and develop the photoresist on the electrode connecting layer film, so that, on the electrode connecting layer film, the photoresist on the area corresponding to the mask pattern is removed, and then the electrode connection layer film at the position without photoresist is removed by an etching process. The photoresist remaining on the electrode connecting layer film is finally peeled off to obtain the structure of the electrode connecting layer 22 as shown in FIG. 8.

The material of the electrode connecting layer 22 may be Ti/Al/Ti, and may also be other metals or metal oxide materials, such as ITO or IZO.

Step 603: forming a first insulating layer, the first insulating layer covering the electrode connecting layer.

In the embodiment of the present disclosure, after the electrode connecting layer 22 is formed with a patterning process, a first insulating layer 23 is deposited by a CVD process, and the first insulating layer 23 covers the electrode connecting layer 22.

The material of the first insulating layer 23 is silicon nitride or silicon oxide.

step 604, forming through holes passing through the first insulating layer on the first insulating layer.

Figure 9:
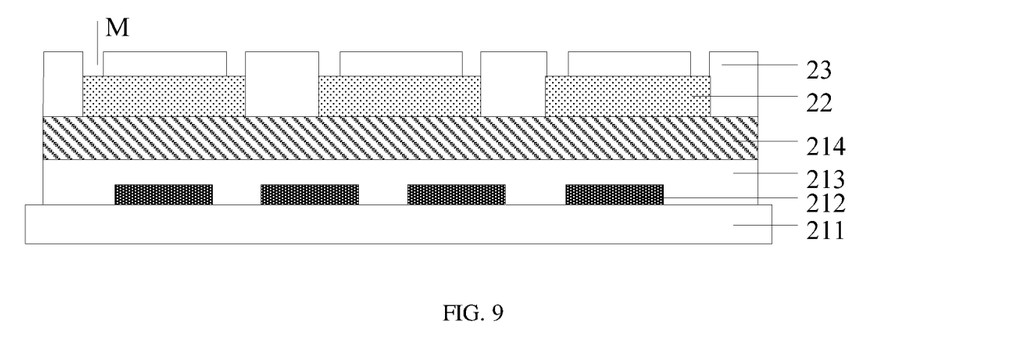
FIG. 9 shows a schematic diagram of a structure after a first insulating layer is formed in an embodiment of the present disclosure.

In the embodiment of the present disclosure, after the first insulating layer 23 is deposited, a photoresist is coated on the first insulating layer 23, and a mask corresponding to the first insulating layer is used to expose and develop the photoresist on the first insulating layer 23, then use an etching process to remove the part of the first insulating layer 23 at the photoresist-free position, and finally the remaining photoresist on the first insulating layer 23 is peeled off, so that a through hole M is formed in the first insulating layer 23. The structure of the first insulating layer 23 shown in FIG. 9 is obtained.

It should be noted that, at positions corresponding to each pattern in the electrode connecting layer 22, two through holes M passing through the first insulating layer 23 are formed, while it is not necessary to form the through holes M between two adjacent patterns in the electrode connecting layer 22.

Step 605: forming an electrode layer on the first insulating layer through a patterning process; wherein the electrode layer includes a plurality of first electrodes and a plurality of second electrodes, and each first electrode and each second electrode are in a closed loop shape structure, and each second electrode surrounds a first electrode, two adjacent first electrodes in each column are connected to the electrode connecting layer via through holes passing through the first insulating layer, and two adjacent second electrodes in each row are connected.

One of the first electrode 241 and the second electrode 242 is an sensing electrode Rx, and the other is a driving electrode Tx. Specifically, the first electrode 241 is an sensing electrode Rx, and the second electrode 242 is a driving electrode Tx; or the first electrode 241 is a driving electrode Tx, and the second electrode 242 is an sensing electrode Rx.

Figure 10:
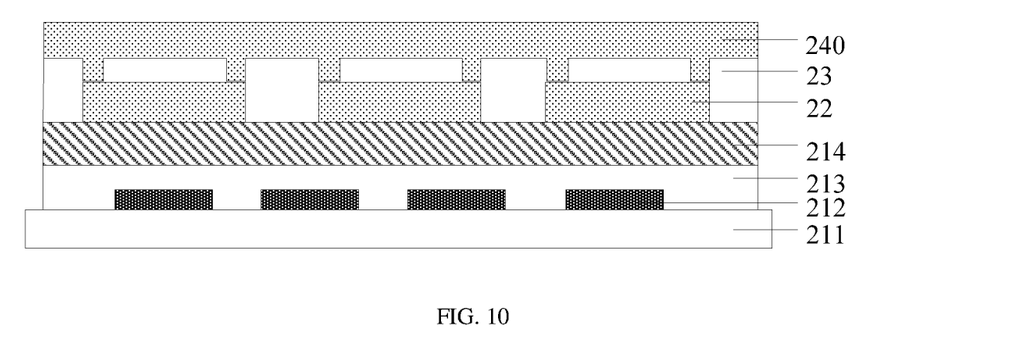
FIG. 10 shows a schematic diagram showing a structure after an electrode layer film is formed in an embodiment of the present disclosure.

In the embodiment of the present disclosure, on the basis of FIG. 9, an electrode layer film 240 is formed on the first insulating layer 23 through a sputtering process to obtain a structure as shown in FIG. 10.

The material of the electrode layer film 240 may be Ti/Al/Ti, and may also be other metals or metal oxide materials, such as ITO or IZO.

Figure 11:
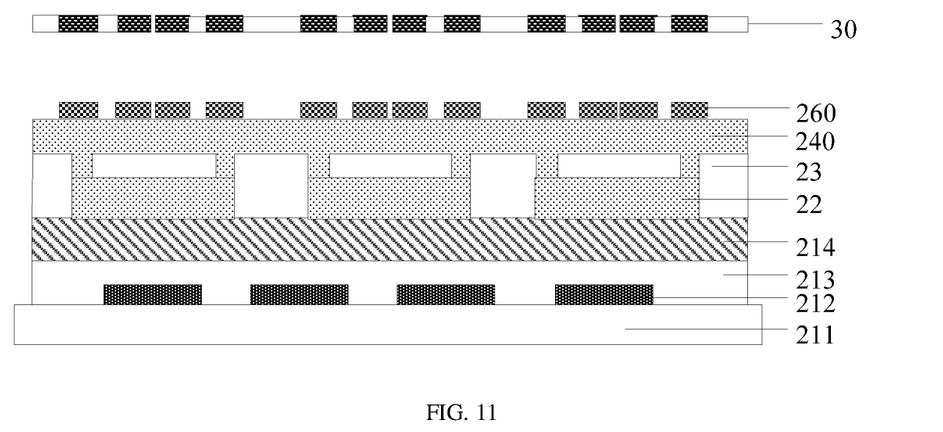
FIG. 11 shows a schematic structural view of a photoresist on an electrode layer film after exposure and development in an embodiment of the present disclosure.

Referring to FIG. 11, a schematic structural diagram of the photoresist on the electrode layer film after exposure and development in the embodiment of the present disclosure is shown.

Firstly, a photoresist 260 is coated on the electrode layer film 240, and a mask 30 corresponding to the electrode layer film 240 is used to expose and develop the photoresist 260 on the electrode layer film 240, so that photoresist 260 corresponding to the light transmitting area of the mask 30 is removed, and the photoresist 260 corresponding to the opaque area of the mask 30 remains, and the structure shown in FIG. 11 is obtained.

Then, the electrode connecting layer film 240 at the position without the photoresist 260 is removed with an etching process. Finally, the remaining photoresist 260 on the electrode connecting layer film 240 is peeled off to form the electrode layer 24, and the structure shown in FIG. 2 is finally obtained.

The electrode layer 24 includes a plurality of first electrodes 241 and a plurality of second electrodes 242. Each first electrode 241 and each second electrode 242 each have a closed loop structure, and each second electrode 242 surrounds a first electrode 241. Two adjacent first electrodes 241 of each column are connected to the electrode connecting layer 22 via through holes M passing through the first insulating layer 23, and two adjacent second electrodes 242 of each row are connected.

In an optional embodiment of the present disclosure, after step 605, the method further includes: forming a planarization layer covering the electrode layer.

After the electrode layer 24 is formed on the first insulating layer 23 through a patterning process, a planarization layer 25 is formed, and the planarization layer 25 covers the electrode layer 24 to obtain a structure as shown in FIG. 5.

A planarization layer 25 covering the electrode layer 24 is formed to implement a flattening process to the touch screen. The material of the planarization layer 25 is an organic material.

In the embodiment of the present disclosure, by providing a substrate, an electrode connecting layer is formed on the substrate through a patterning process, a first insulating layer covering the electrode connecting layer is formed, through holes passing through the first insulating layer is formed in the first insulating layer, and an electrode layer is formed on the first insulating layer through a patterning process. The electrode layer includes a plurality of first electrodes and a plurality of second electrodes. Each first electrode and each second electrode have a closed loop structure, and each second electrode surrounds a first electrode. Two adjacent first electrodes in each column are connected to the electrode connecting layer via through holes passing through the first insulating layer, and two adjacent second electrodes in each row are connected. A plurality of first electrodes and a plurality of second electrodes are provided in the electrode layer, and the second electrode surrounds the first electrode, thereby reducing the area occupied by the first electrode. The first electrode is an sensing electrode and the second electrode is a driving electrode; or, the first electrode is a driving electrode and the second electrode is an sensing electrode, both of which can greatly increase the number of driving electrodes and sensing electrodes provided in the touch screen in a unit area, and improve the utilization rate of the touch screen. Furthermore, the touch resolution is improved, so that the touch accuracy is improved.

An embodiment of the present disclosure provides a touch display device including the touch screen as described above.

Of course, the touch display device further includes a driving chip, which is respectively connected to the first electrode 241 and the second electrode 242 in the electrode layer 24. When the first electrode 241 is an sensing electrode Rx and the second electrode 242 is a driving electrode Tx, it is used to provide a detection signal to the second electrode 242 in the electrode layer 24 and receive a signal from the first electrode 241 in the electrode layer 24 to calculate the user's touch position; or when the first electrode 241 is the driving electrode Tx and the second electrode 242 is the sensing electrode Rx, it is used to provide a detection signal to the first electrode 241 in the electrode layer 24 and receive a signal from the second electrode 242 in the electrode layer 24 to calculate a user's touch position.

For the specific description of the touch screen, reference may be made to the above description, which is not repeated in this embodiment.

In practical applications, the touch display device may be any products or components with a touch display function, such as a mobile phone, a tablet computer, a television, a display, a notebook computer, a navigator.

In the embodiment of the present disclosure, the touch display device includes a touch screen. By forming an electrode connecting layer on a substrate, a first insulating layer covering the electrode connecting layer is formed, and an electrode layer is formed on the first insulating layer. The electrode layer includes a plurality of first electrodes and a plurality of second electrodes, the first electrodes and the second electrodes all have a closed loop structure, and each second electrode surrounds a first electrode, and two adjacent first electrodes in each column are connected to the electrode connecting layer via the through holes passing through the first insulating layer respectively, and two adjacent second electrodes in each row are connected. A plurality of first electrodes and a plurality of second electrodes are provided in the electrode layer, and each second electrode surrounds a first electrode, thereby reducing the area occupied by the first electrode. The first electrode is an sensing electrode and the second electrode is a driving electrode; or, the first electrode is a driving electrode and the second electrode is an sensing electrode, both of which can greatly increase the number of driving electrodes and sensing electrodes provided in the touch screen in a unit area, and improve the utilization rate of the touch screen. Furthermore, the touch resolution is improved, so that the touch accuracy is improved.

In the foregoing method embodiments, for convenience of description, it is expressed as a combination of a series of steps. However, those skilled in the art should know that the present disclosure is not limited by the order of the above steps, because according to the present disclosure, some steps may be performed in other orders or simultaneously. Secondly, those skilled in the art should also know that the embodiments described in the specification are all optional embodiments, and the steps and modules involved are not necessarily required by the present disclosure.

Each embodiment in this specification is described in a progressive manner. Each embodiment focuses on the differences from other embodiments, and the same or similar parts between the various embodiments may refer to each other.

Finally, it should be noted that in this context, relational terms such as first and second are used only to distinguish one entity or operation from another entity or operation, and do not necessarily require or imply there is any such actual relationship or order between entities or operations. Moreover, the terms "include" "comprise" or any other variation thereof are intended to encompass non-exclusive inclusion, such that a process, method, product, or device that includes a series of elements includes not only those elements but also those other elements that are not explicitly listed, but also elements that are inherent to such processes, methods, goods, or equipment. Without more restrictions, the elements defined by the sentence "including a . . . " do not exclude the existence of other same elements in the process, method, product or equipment including the elements.

The touch screen, the method for manufacturing the same, and the touch display device provided by the present disclosure have been described in detail above. The specific examples are used in this context to explain the principles and implementation of the present disclosure. The descriptions of the above embodiments only intends to help for understanding the methods and core ideas of the present disclosure; at the same time, for those skilled in the art, according to the ideas of the present disclosure, there will be modifications in the specific implementation and scope of application. In summary, the content of this description should be understood as limiting the present disclosure.

What is claimed is:

1. A touch screen, comprising:
    a substrate;
    an electrode connecting layer on the substrate;
    a first insulating layer covering the electrode connecting layer; and
    an electrode layer on the first insulating layer;
    wherein the electrode layer comprises a plurality of first electrodes arranged in an array and a plurality of second electrodes arranged in an array;
    wherein each first electrode and each second electrode are in a closed loop structure, and each second electrode surrounds a first electrode; and
    wherein two adjacent second electrodes in each row of the second electrodes are in a same layer and are in contact with each other, the first insulating layer comprises a plurality of through holes to expose a part of the electrode connecting layer, and two adjacent first electrodes in each column of the first electrodes are respectively electrically connected to the electrode connecting layer through the through holes to electrically connect the two adjacent first electrodes.

2. The touch screen according to claim 1, wherein the first electrodes are one of sensing electrodes or driving electrodes, and the second electrodes are the other of sensing electrodes or driving electrodes.

3. The touch screen according to claim 2, wherein an area of each first electrode is equal to an area of each second electrode.

4. The touch screen according to claim 3, wherein each first electrode and each second electrode are both in a Ti/Al/Ti laminated structure.

5. The touch screen according to claim 4, further comprising a planarization layer covering the electrode layer.

6. A touch display device comprising the touch screen according to claim 5.

7. The touch screen according to claim 1, wherein an area of each first electrode is equal to an area of each second electrode.

8. The touch screen according to claim 1, wherein the closed loop structure is any one of a diamond shape, a rectangular shape, a trapezoidal shape, a hexagonal shape, and a circular shape.

9. The touch screen according to claim 1, wherein each first electrode and each second electrode are both in a Ti/Al/Ti laminated structure.

10. The touch screen according to claim 9, wherein a material of the electrode connecting layer is the same as that of the electrode layer.

11. The touch screen according to claim 1, further comprising a planarization layer covering the electrode layer.

12. A method for manufacturing a touch screen, comprising:
providing a substrate;
forming an electrode connecting layer on the substrate through a patterning process;
forming a first insulating layer, and covering the electrode connecting layer with the first insulating layer;
forming a plurality of through holes passing through the first insulating layer to expose a part of the electrode connecting layer; and
forming an electrode layer on the first insulating layer through a patterning process, wherein the electrode layer comprises a plurality of first electrodes arranged in an array and a plurality of second electrodes arranged in an array, each first electrode and each second electrode are in a closed loop structure, and each second electrode surrounds a first electrode,
wherein two adjacent second electrodes in each row of the second electrodes are in a same layer and are in contact with each other, and two adjacent first electrodes in each column of the first electrodes are respectively electrically connected to the electrode connecting layer through the through holes to electrically connect the two adjacent first electrodes.

13. The method according to claim 12, wherein the first electrodes are one of sensing electrode or driving electrodes, and the second electrodes are the other of sensing electrodes or driving electrodes.

14. The method according to claim 12, further comprising:
forming a planarization layer covering the electrode layer.

15. A touch display device comprising the touch screen according to claim 1.

16. The touch display device according to claim 15, wherein the touch display device further comprises a light-emitting device, a encapsulation layer and a second insulating layer, the light-emitting device, the encapsulation layer and the second insulating layer are sequentially disposed on the substrate in a direction away from the substrate, the encapsulation layer covers the light-emitting device, and the electrical connecting layer is located on a side of the second insulating layer away from the substrate.

17. A method for manufacturing a touch display device, comprising the method for manufacturing the touch screen according to claim 12.

18. The method according to claim 17, wherein before the step of forming an electrode connecting layer on the substrate through a patterning process, the method further comprises:
forming a light-emitting device on the substrate;
forming an encapsulation layer covering the light-emitting device; and
forming a second insulating layer on the encapsulation layer.

* * * * *